(12) United States Patent
Lehman

(10) Patent No.: US 6,338,774 B1
(45) Date of Patent: Jan. 15, 2002

(54) LIQUID DISTRIBUTOR FOR NON-VERTICAL DISTILLATION COLUMNS, AND DISTILLATION COLUMN INCLUDING THE SAME

(75) Inventor: Jean-Yves Lehman, Maisons-Alfort (FR)

(73) Assignee: L'Air Liquide Societe Anonyme pour l'Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 09/193,119

(22) Filed: Nov. 17, 1998

(30) Foreign Application Priority Data

Nov. 17, 1997 (FR) ............................................. 97 14377

(51) Int. Cl.⁷ ............................. B01D 3/26; B01V 19/32
(52) U.S. Cl. ............................. 202/83; 159/3; 159/43.1; 159/48.1; 196/110; 196/115; 196/128; 196/133; 196/135; 202/158; 202/236; 202/237; 261/DIG. 72
(58) Field of Search .............................. 202/158, 237, 202/83, 236; 159/43.1, 3, 48.1; 261/97, 111, DIG. 72; 196/133, 135, 139, 110, 115, 128; 239/548

(56) References Cited

U.S. PATENT DOCUMENTS

| 4,776,989 A | | 10/1988 | Harper et al. ................. 261/97 |
| 5,381,839 A | * | 1/1995 | Dowd ........................ 141/242 |
| 5,518,667 A | * | 5/1996 | Lehman ...................... 261/97 |
| 5,593,734 A | * | 1/1997 | Yuan et al. ................. 427/420 |
| 5,919,405 A | * | 7/1999 | Menon et al. ............... 261/97 |

FOREIGN PATENT DOCUMENTS

| DE | 11 13 680 | | 9/1961 |
| FR | 2771019 | * | 5/1999 |
| GB | 2 039 779 | | 8/1980 |
| GB | 2 062 489 | | 5/1981 |

* cited by examiner

Primary Examiner—Virginia Manoharan
(74) Attorney, Agent, or Firm—Young & Thompson

(57) ABSTRACT

A liquid distributor includes a principal container with a perforated bottom, as well as transport members to transmit, by gravity, the liquid from at least one opening in the perforated bottom, to a supply point not in vertical alignment with this opening.

33 Claims, 4 Drawing Sheets

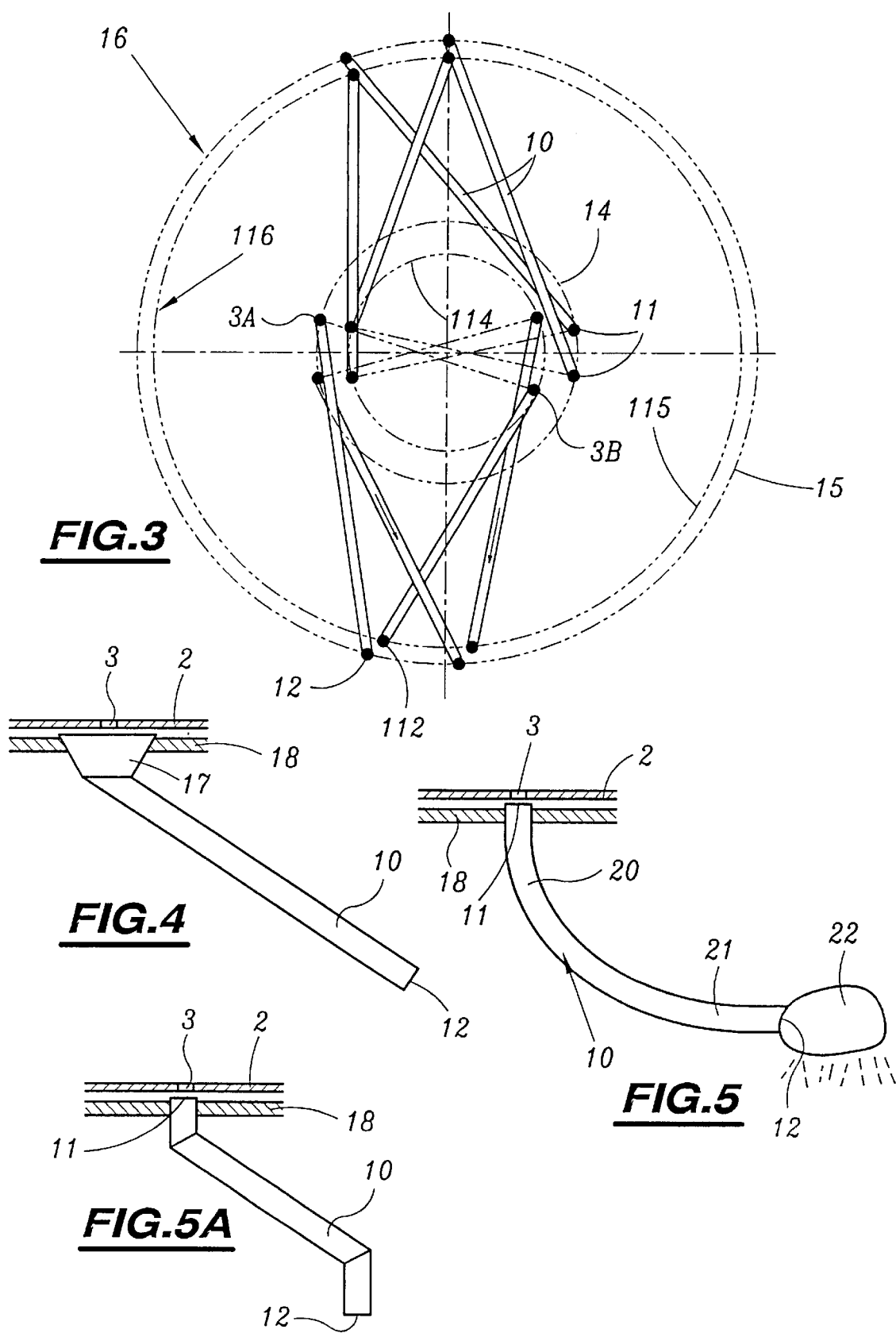

LIQUID DISTRIBUTOR FOR NON-VERTICAL DISTILLATION COLUMNS, AND DISTILLATION COLUMN INCLUDING THE SAME

The present invention relates to a liquid distributor for distillation columns, of the type comprising a principal volume having in its lower portion outlet openings distributed about a region.

Floating petroleum platforms produce residual gases. For environmental and economic reasons, it is more and more necessary to recover these gases. One method consists in their conversion to heavier hydrocarbons, in the form of liquid and hence more easily transportable, by the Fischer-Tropsch process, which consumes large quantities of oxygen.

It would be interesting to be able to provide an on-board air distillation column on a floating platform or a barge, but the good operation of such equipment is burdened with serious difficulties. Thus, a first requirement is that the liquid be uniformly distributed at the head of the column over all the cross section of this latter despite the swinging of its axis due to swell.

The invention has for its object to provide a liquid distributor whose operation will be less sensitive to such oscillations.

To this end, the invention has for its object a liquid distributor of the recited type, characterized in that it comprises a transport member adapted to transmit by gravity the liquid from at least one opening in the perforated bottom to a supply point not located in vertical alignment with this opening.

The distributor according to the invention can comprise one or several of the following characteristics:
- the opening is constituted by a single perforation or by several perforations adjacent each other;
- the transport member comprises an inlet end located below and in vertical alignment with said opening and spaced from the outlet end of this latter;
- the transport member comprises an upwardly open conduit in the form of a trough or closed in the form of a tube, this conduit being straight, bent at one or several locations or curved;
- the transport member comprises at its outlet end a spray device for a spray region whose area is greater than that of said opening;
- the mean diameter of said region is less than the mean diameter of the surface containing the outlet openings of the transport members, the ratio of the diameters being particularly about 1 to 6;
- the distributor comprises transport member associated with a group of openings spaced from each other and adapted to carry the liquid flow from these openings substantially to a common supply point not located in vertical alignment with said openings;
- the transport member comprises several conduits, particularly several tubes, whose inlets are adapted to receive the liquid flow from said openings, these conduits joining in a single conduit for the group of openings;
- the total flow rate of said flow remains substantially constant when the distributor inclines;
- the transport member or members associated with two openings substantially diametrically opposed relative to a central axis of said region and of the same area, lead substantially to a common supply point;
- the liquid flow from at least one opening or group of openings is carried by the transport member or members such that its flow rate becomes greater when the sprayed region is raised under the influence of the inclination and less in the contrary case;
- the transport member associated with each opening leads to a supply point situated angularly at an angle of 180° from this opening relative to a central axis of the distributor;
- the openings are disposed in a first substantially horizontal plane in concentric substantially circular crowns each corresponding to a crown of outlet openings disposed in a second substantially horizontal plane located below the first plane and comprising the same number of supply points, and a transport member connected to each point of the first crown at a point associated with the second crown;
- the couples of associated points are offset angularly by a same angle about the axis of the crowns, the transport member connecting two crowns forming an envelope surface in the shape of a sleeve and the assembly of the transport members forming a series of such envelope surfaces nested within each other;
- said angular offset is reversed from one envelope surface to the following;
- said angular offset is comprised between about 80 and 100°;
- said angular offset is comprised between about 100 and 180°;
- the outlet ends of the transport members supply the liquid to several secondary distribution receptacles with perforated bottoms.

The invention also has for its object a distillation column characterized in that it comprises, at at least one level, a liquid distributor as defined above, above a distillation section.

According to other characteristics of this distillation column:
- the distillation section has cross-corrugated packing;
- the distributor is a distributor at the head of the column, said principal volume being at least partially disposed within the upper dome of this latter;
- the transport members deliver directly the liquid onto the distillation section;
- the column is on-board a floating structure such as a floating petroleum platform or a barge.

BRIEF DESCRIPTION OF THE DRAWINGS

Examples of embodiment of the invention will now be described with respect to the accompanying drawings, in which:

FIG. 3 is a schematic plan view of the distributor of FIG. 2;

FIG. 4 shows schematically a liquid transport member of this distributor;

FIGS. 5 and 5A are similar views of two modifications;

DETAILED DESCRIPTION OF THE INVENTION

Figure 1:
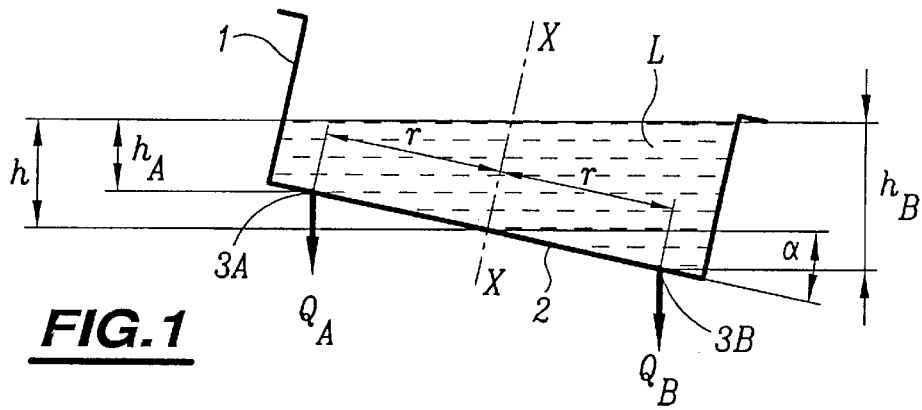
FIG. 1 shows schematically, in axial cross section, a receptacle with a perforated bottom in an inclined position.

There is shown in FIG. 1 a receptacle 1 in the form of a basin whose bottom 2 is perforated with openings 3 and has a circular shape with a normally vertical X—X axis. The openings 3 can particularly be circular holes and, unless otherwise indicated, it will be supposed that such is the case and that the holes are all identical.

When the receptacle contains a liquid L and the axis X—X is inclined at an angle $\alpha$ to the vertical, the openings 3 located at a same distance r from this axis supply different flow rates, because they are surmounted by different heights of liquid.

Thus, in the inclination plane, which is that of FIG. 1, the upper opening 3A supplies a flow rate $Q_A$ proportional to the $\sqrt{h-r \sin \alpha}$, whilst the lower opening 3B supplies a flow rate $Q_B$ proportional to the $\sqrt{h+r \sin \alpha}$. Under conditions of oscillation due to swell, if the receptacle forms a head distributor of an on-board distillation column, with its radius substantially identical to that of the column, the difference of flow rate can be of the order of 10% or more, which is unacceptable to ensure satisfactory operation of the column.

Figure 2:
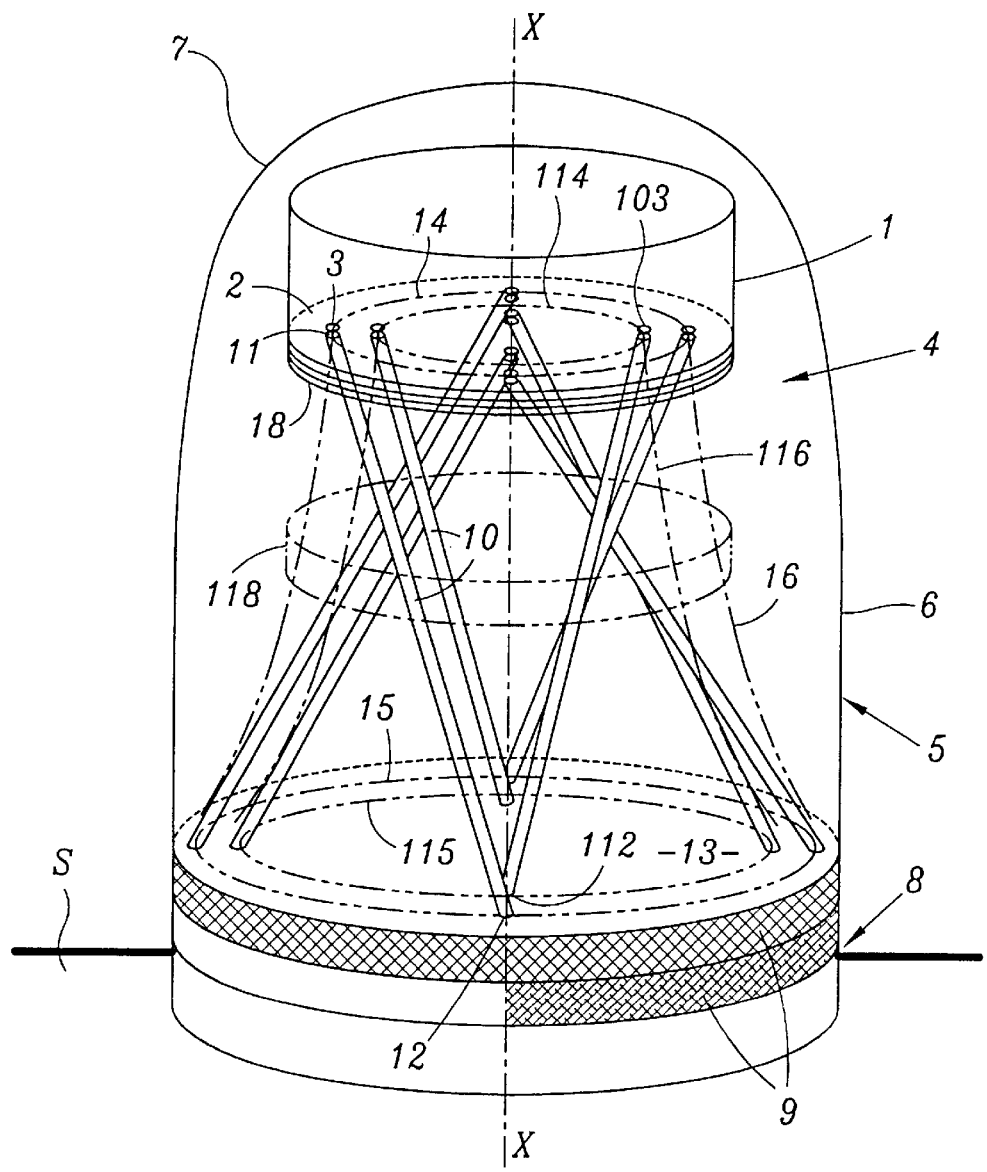
FIG. 2 shows schematically in perspective a liquid distributor according to the invention, disposed at the head of a distillation column.

FIGS. 2 and 3 show a liquid distributor 4 which comprises a receptacle 1 and which, on the contrary, ensures practically uniform distribution of the liquid over all the cross section of the distillation column 5 no matter what the inclination, under the mentioned conditions of oscillation. As a modification, the receptacle 1 could moreover be replaced by a series of troughs with perforated bottoms, or by a layer of perforated tubes.

The distillation column 5 comprises, in its upper portion, a cylindrical collar 6 with an axis X—X, and an upper dome 7. The column is on board a floating structure schematically shown at S in FIG. 2. The upper distillation section 8 of the column is constituted by a cross-corrugated packing.

As is well known, such a packing comprises a superposition of sections or packs 9 of cross-corrugated packing, of which each has the form of a cylindrical cake occupying all the cross section of the column.

Each pack 9 is constituted by a stack of corrugated strips with oblique corrugations. Each strip comprises a generally vertical plane, all the strips have the same height, and the corrugations are alternately inclined in opposite directions from one strip to the next. Thus, the corrugations of adjacent strips touch at a large number of points of intersection. Moreover, the packs 9 are offset angularly by 80% from one pack to the following one, relative to the general axis of the column.

The receptacle 1, upwardly opening and of a diameter substantially less than the internal diameter of the collar 6, is disposed in the dome 7. The ratio of the diameters is typically 1 to 6. The bottom 2 of the receptacle 1 comprises as many openings 3 as are desired points of distribution of the liquid over the upper pack 9, namely typically 1000 to 3000 openings for a column of about 4 meters diameter.

The distributor 4 moreover comprises one rectilinear tube 10 per opening 3. Each tube 10 has an upper inlet opening 11 disposed just below the corresponding opening 3, and a lower outlet opening 12 disposed just above the upper surface 13 of the upper pack 9. If r and R designate respectively the distances to the axis X—X of the openings 11 and 12, then R>r. Moreover, the point 12 is angularly offset by 90° about the axis X—X relative to the point 11, as is seen in FIGS. 2 and 3.

The openings 3 are disposed in a series of concentric crowns. With each crown 14 of mean radius r is associated a crown 15 of mean radius R of the surface 13, and all the tubes which connect these two crowns are inclined in the same direction. Thus, the assembly of the tubes 10 associated with two homologous given crowns 14 and 15 constitute generatrices of a hyperboloid of revolution 16.

For two adjacent pairs of crowns 14 and 114, the tubes 10 are inclined in opposite directions, thereby forming two hyperboloids of revolution 16 and 116 nested within each other. The hyperboloid 116 schematically shown in FIG. 2 thus corresponds to the crowns 114 and 115 located immediately within the crowns 14 and 15 mentioned above.

The assembly of tubes 10 forms in this way a stack of hyperboloids of revolution whose generatrices are alternately inclined in the two directions.

When the axis X—X is vertical, all the tubes 10 supply the same flow rate of liquid because of the symmetry of revolution of the assembly of the distributor 4.

When the axis X—X is inclined, the radius of the receptacle 1, substantially less than that of the column, has the effect of reducing the differences of flow rate between the openings 3 of its bottom 2.

Moreover, the pairs of substantially diametrically opposite openings belonging to the two adjacent crowns 14, 114 are interconnected by their tubes 10 at two points 12, 112 adjacent to each other, because they are located substantially in the same radial half-plane passing through the axis X—X and belonging to two adjacent crowns 15, 115.

As a result, the region of the surface 13 situated just below the points 12 and 112 will receive the total flow rates emitted by a substantially diametrically opposed pair of openings of the receptacle 1, which total is practically constant for all the pairs of openings.

It therefore suffices that the area of the region in question will be sufficiently small that the two flow rates will be well remixed by the cross-corrugated packing, such that the distribution of the liquid over all the surface 13 remains permanently substantially uniform despite the oscillations of the axis X—X.

It should moreover be noted that the structure of the distributor 1 lets the rising gas pass through without substantial pressure drop, between the tubes 10 and about the receptacle 1.

FIG. 4 shows a rectilinear tube 10, provided at its inlet with a funnel 17 which guarantees the collection of all the liquid from the corresponding opening 3. All of the funnels 17 are fixed in place by means of a plate 18 with openings of the same diameter as the receptacle 1, disposed at a small distance below the bottom 2 and fixed to this latter.

Moreover, as shown schematically in FIG. 2, all the tubes 10 are positioned relative to each other at an intermediate level between the receptacle 1 and the surface 13, by a suitable positioning structure 118.

FIG. 5 shows several modifications of the arrangement of FIG. 4:

On the one hand, the funnel 17 is omitted, and the inlet opening 11 of the tube 10, of a diameter substantially greater than that of the opening 3, is positioned just below the lower end of this latter, but spaced from the latter, by means of the plate 18 connected to the receptacle 1.

On the other hand, the tubes 10 are incurved, with an upstream portion 20 for acceleration of the liquid, with a steep slope, and a downstream portion 21 with a more gentle slope.

Finally, the lower end 12 of the tubes 10 is provided with a spray head 22, which promotes the spreading of the distribution of the liquid over the surface 13. Thus, the spray head 22 distributes the liquid over an area of the surface 13 greater than that of the corresponding opening 3.

In this example, the curved tubes associated with the two homologous crowns are wound so as to generate about the axis X—X a surface in the form of a sleeve. Thus, the assembly of the curved tubes forms a series of such surfaces nested within each other, the direction of winding of the tubes being reversed from one surface to the next.

The modification of FIG. 5A differs from the preceding one, on the one hand, by the omission of the spray head 22, and on the other hand by the shape of the tube 10. Thus, the latter comprises a principal inclined rectilinear portion, as does that of FIG. 4, and is elbowed to form two end portions which are also rectilinear but vertical.

Figure 6:
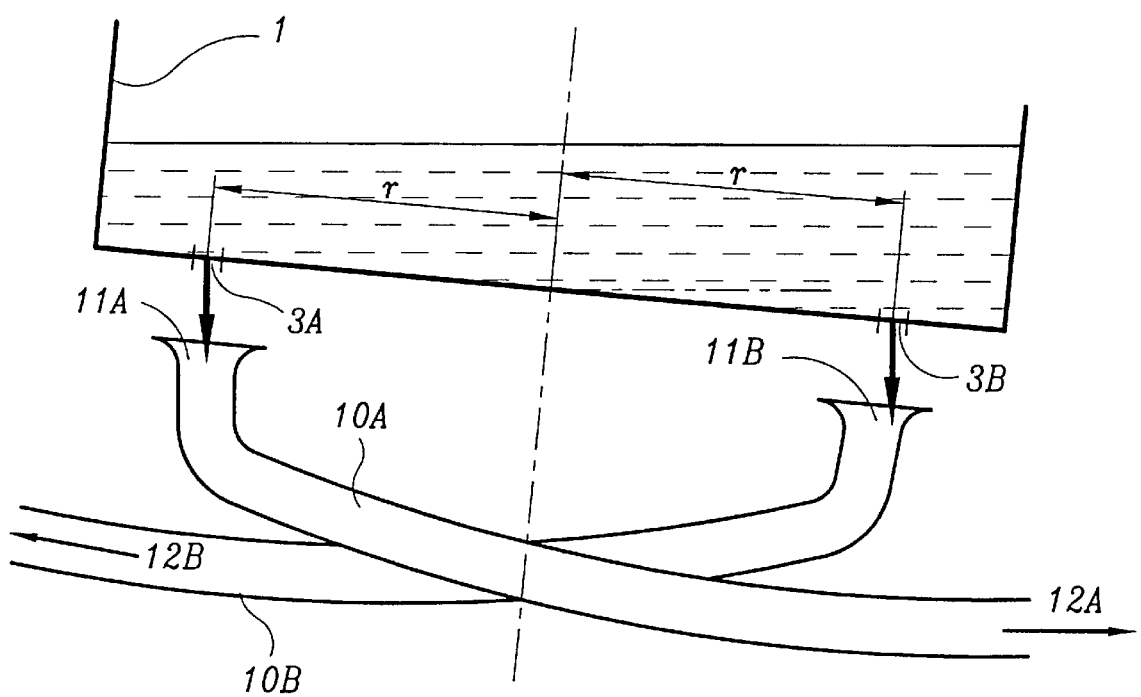
FIG. 6 shows schematically another embodiment of the liquid distributor according to the invention.

FIG. 6 shows another manner of correcting the effects of inclination of the column, by obtaining a liquid distribution which anticipates the poor distribution in the packing due to that inclination. Thus, under the influence of that inclination, the liquid has the tendency to accumulate on one side of the column, whilst the other side progressively dries out. It would therefore be desirable to supply the drying out side with a greater liquid flow rate and the opposite side with a lower flow rate.

To do that, the tubes 10A and 10B associated with the substantially diametrically opposite openings 3A and 3B, lead to points 12A, 12B on the surface 13 which are also substantially diametrically opposed but which are reversed relative to the two openings. Thus, the point 12A (respectively 12B) is located substantially in the same radial half-plane, relative to the axis X—X, as the opening 3B (respectively 3A). This arrangement therefore permits spraying more intensively the regions of the packing that are apt to dry out under the influence of the inclination. However, to obtain as before a structure permeable to rising gas and without crossing between the tubes 10, the provision of numerous tubes 10 supposes in this case their provision in a complex shape, namely helicoidal, which is more complicated than the embodiment of FIGS. 1 and 2.

In the example of FIG. 6, the point 12A is angularly offset by 180° about X–X' relative to the point 11A. For angles comprised between 100° and 180°, there is obtained a greater or lesser effect of correction or of the distribution, the maximum being reached at 180°.

Figure 7:
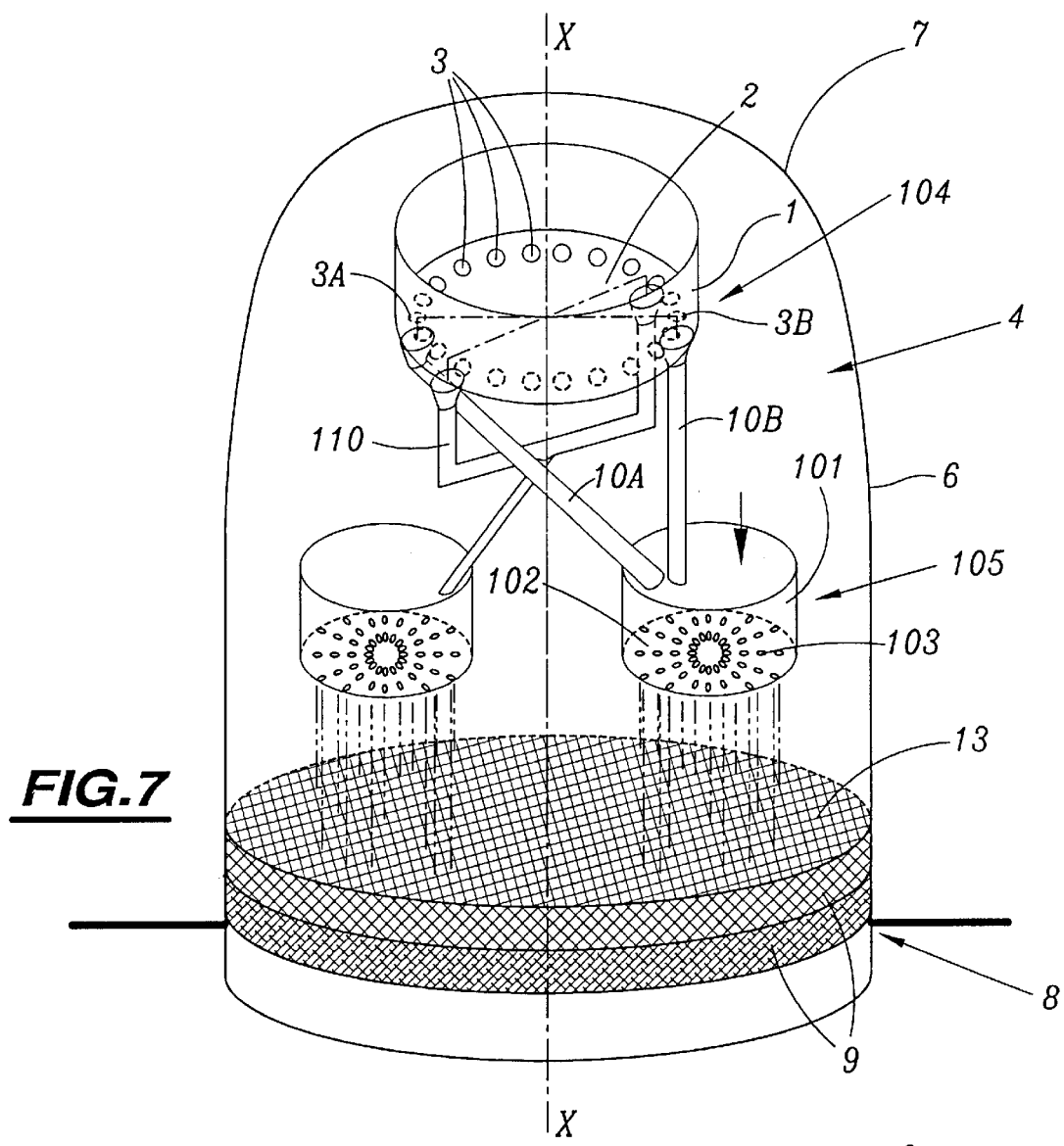
FIG. 7 is a schematic perspective view showing the principal of operation of yet another embodiment of the liquid distributor according to the invention.

The mode of compensation of flow rate of FIGS. 1 and 2 is used in the embodiment of distributor 4 schematically shown in FIG. 7, but in a two-stage distribution configuration. Thus, the receptacle 1, whose bottom 2 comprises a number n of openings 3 very much less than the total number N of the spray points of the surface 13, for example 32 openings 3, forms a precise predistribution stage 104 of the liquid. The openings 3 are disposed in a single crown, adjacent the peripheral wall of the receptacle 1.

At a lower level is located an additional stage 105 for local distribution of the liquid, constituted by n/2=16 secondary receptacles 101 upwardly open and with perforated bottoms 102, of the same area and the same perforation concentration, regularly spaced over the cross section of the column (only two receptacles 101 have been shown, for clarity). Each bottom 102 is pierced by n' openings 103 such that $(n/2) \times n' = N$, namely, for example, n'=200, which corresponds to N=3200 holes.

Each secondary receptacle 101 is supplied by two tubes 10A, 10B themselves supplied respectively by two diametrically opposed openings 3A, 3B, as before. There is thus on the one hand a compensation for the inclination of the level of the distribution stage 104, plus a substantial reduction of the effect of inclination in each secondary receptacle 101, thanks to the small dimensions of the latter.

As a modification, as shown in broken lines in FIG. 7, the arrangement of the openings 3A and 3B can be carried out by replacing the two tubes 10A and 10B by a single T-shaped tube 110 which receives the flows of liquid from the two diametrically opposed openings and combines them in a single flow in the stem of the T.

Figure 8:
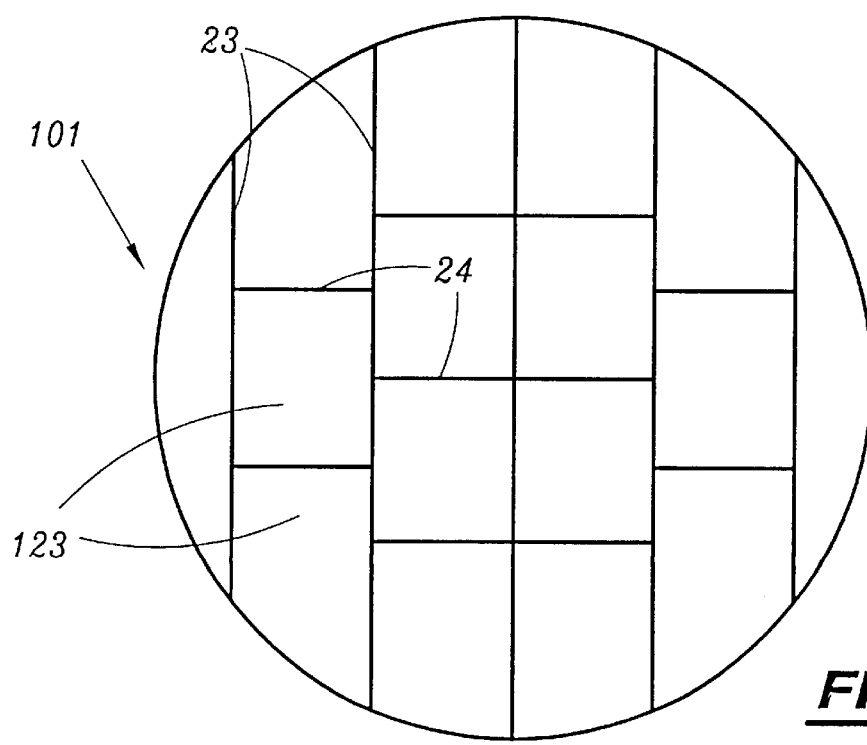
FIG. 8 is a top plan view of a specific embodiment of the second stage of the distributor of FIG. 7.

There is shown in FIG. 7 an assembly of receptacles 101 spaced from each other, to explain the operation of the distributor. However, in practice, there will be used a single receptacle 101 (FIG. 8) having substantially the diameter of the surface 13 and subdivided in an axially symmetrical way into 16 compartments 123 all having the same area and the same perforation density. These 16 compartments can for example be obtained by means of five partitions 23 parallel to each other, forming chords of the receptacle 101, of which one is a diameter, and by ten partitions 24 perpendicular to the preceding ones.

As will be understood, the manner of correction or "over-compensation" of the flow rates schematically shown in FIG. 6 can also be applied to the transportation of liquid from the receptacle 1 to the receptacles 101 or to the compartments 123 in the case of a two-stage distributor.

Figure 9:
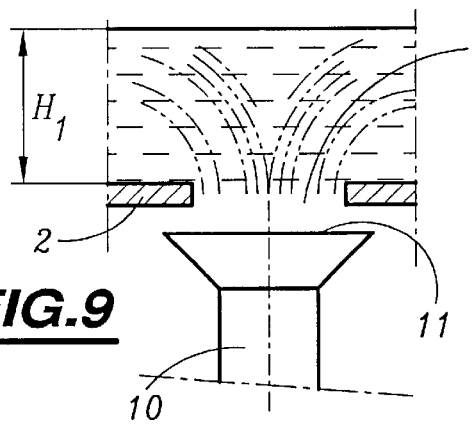
FIGS. 9 and 10 show schematically two modifications of a detail of the distributor according to the invention.
Figure 10:
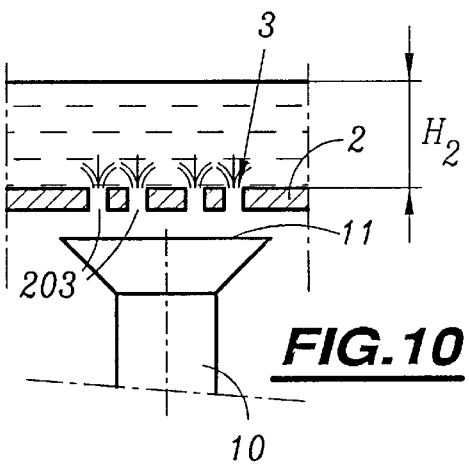

In each of the embodiments described above, each opening 3, instead of being constituted by a single perforation of a relatively large diameter, could be constituted by a group of perforations 203 of small diameter near each other. The resulting advantage is to permit obtaining a given flow rate of liquid with a height $H_2$ (FIG. 10) less than the height $H_1$ necessary in the case of a single perforation (FIG. 9), which creates an agitating vortex effect. However, the diameter of the multiple perforations 203 must remain sufficient to avoid any risk of plugging by impurities contained in the liquid to be distilled.

As will be understood, the invention is applicable also to the distribution of reflux liquid in a fixed column but whose axis is not perfectly vertical.

WO-A-90/10 497 discloses among other things a packing analogous to the above cross-corrugated packings, but perforated in a different manner. The term "cross-corrugated packing" used herein also comprises such a packing, as well as any analogous packing.

What is claimed is:

1. A liquid distributor for a distillation column, comprising:

a principal container having a plurality of outlet openings in a lower portion thereof, said plurality of outlet openings being distributed over a region of said container;

a common supply point located at a level below said plurality of outlet openings, said common supply point not being located in vertical alignment with said respective plurality of outlet openings; and at least two transport members extending from respective said plurality of outlet openings, spaced from each other and extending to said common supply point.

2. The distributor according to claim 1, wherein said openings have a single perforation or several perforations adjacent each other.

3. The distributor according to claim 1, wherein said at least two transport members comprise an inlet end located below and in vertical alignment with said respective openings and spaced from an outlet end of the openings.

4. The distributor according to claim 1, wherein said at least two transport members comprise an upwardly open conduit or closed tube, said conduit being rectilinear, elbowed at one or several points, or curved.

5. The distributor according to claim 4, wherein said open conduit is a trough.

6. The distributor according to claim 1, wherein said at least two transport members comprise, at their outlet ends, a device for spraying said region, an area of said region is greater than an area of one of said plurality of outlet openings.

7. The distributor according to claim 1, wherein a mean diameter of said region is less than a mean diameter of a surface containing said common supply point, a ratio of the diameters being about 1 to 6.

8. The distributor according to claim 1, wherein said at least two transport members are aligned with a group of said outlet openings spaced from each other, said at least two transport members transmitting liquid from said group of outlet openings to said common supply point.

9. The distributor according to claim 8, wherein said at least two transport members comprise several conduits having inlets to receive a liquid flowing from said outlet openings, said conduits joining as a single conduit for the group of said outlet openings.

10. The distributor according to claim 9, wherein said conduits are tubes.

11. The distributor according to claim 8, wherein a total flow rate of the liquid, remains substantially constant when the distributor is inclined.

12. The distributor according to claim 11, wherein two of said at least two transport members are associated with two of said outlet openings that are substantially diametrically opposed relative to a central axis of said region and having a same area, and lead to said common supply point.

13. The distributor according to claim 1, wherein a liquid flowing from at least one of said outlet openings is conveyed by said at least two transport members such that a flow rate of the liquid increases when a sprayed region is at a higher level under an influence of an inclination of the column and decreases when the sprayed region is at a lower level under the influence of the inclination.

14. The distributor according to claim 1, wherein said at least two transport members have outlet ends for supplying a liquid to several secondary distribution receptacles having perforated bottoms.

15. A liquid distributor for a distillation column comprising:
- a principal container having a plurality of outlet openings in a lower portion thereof, said openings being distributed over a region of said container, said region having a central axis;
- a supply point located angularly at an angle to respective ones of said outlet openings relative to said central axis, said angle being in the range of substantially 100° to 180°; and
- a plurality of transport members extending from each respective said opening, each of said plurality of transport members leading to said supply point.

16. The distributor according to claim 15, wherein outlet ends of said plurality of transport members supply a liquid to several secondary distribution receptacles having perforated bottoms.

17. A liquid distributor for a distillation column, comprising:
- a principal container having a plurality of outlet openings in a lower portion thereof, said plurality of outlet openings being distributed over a region of said container;
- a common supply point located at a level below said plurality of outlet openings, said common supply point not being located in vertical alignment with said respective plurality of outlet openings; and
- at least two transport members extending from respective said plurality of outlet openings, spaced from each other and extending to said common supply point, wherein said plurality of outlet openings being disposed in a first substantially horizontal plane in substantially circular concentric crowns corresponding each to a crown of said common supply points distributed in a second substantially horizontal plane located below the first plane and comprising a same number of said common supply points, each of said at least two transport members connects each of said plurality of outlet openings of the first crown to an associated said common supply point of the second crown to form pairs of associated points.

18. The distributor according to claim 17, wherein the pairs of associated points are angularly offset by a same angle about an axis (X—X) of the first and second crowns, said at least two transport members connecting two crowns forming an envelope surface and an assembly of said at least two transport members forming a series of such envelope surfaces nested within each other.

19. The distributor according to claim 18, wherein said envelope surface is a sleeve.

20. The distributor according to claim 18, wherein said angular offset is reversed from a first said envelope surface to a second said envelope surface.

21. The distributor according to claim 20, wherein said angular offset is between about 100° and 180°.

22. A liquid distributor for a distillation column, comprising:
- a principal container having a plurality of outlet openings in a lower portion thereof, said plurality of outlet openings being distributed over a region of said container;
- a common supply point located at a level below said plurality of outlet openings, said common supply point not being located in vertical alignment with said respective plurality of outlet openings; and
- at least two transport members extending from respective said plurality of outlet openings, spaced from each other and extending to said common supply point, wherein one of said at least two transport members connects a point of a first crown of said plurality of outlet openings to a second crown of a plurality of said supply points to form a pair of associated points, said pair of associated points are angularly offset by a same angle about an axis of the crowns, said angular offset being between about 80° and 100°.

23. A liquid distributor for a distillation column, comprising:
- a principal container having a plurality of outlet openings in a lower portion thereof, said plurality of outlet openings being distributed over a region of said container;
- a common supply point located at a level below said respective plurality of outlet openings, said common supply point not being located in vertical alignment with respective ones of said plurality of outlet openings;

at least two transport members extending from respective ones of said plurality of outlet openings spaced from each other and extending to said common supply point; and a distillation section surrounding said distributor.

24. The distributor according to claim 23, wherein the distillation section has cross-corrugated packing.

25. The distributor according to claim 23, wherein said distributor is a head distributor of the column; and said principal container being at least partially disposed within an upper dome of said column.

26. The distributor according to claim 23, wherein said column is on a floating structure.

27. The distributor according to claim 26, wherein said floating structure is a floating petroleum platform or a barge.

28. A liquid distributor for a distillation column, comprising:

a principal container having a plurality of outlet openings in a lower portion thereof, said plurality of outlet openings being distributed over a region of said container;

a common supply point located at a level below said plurality of outlet openings, said common supply point not being located in vertical alignment with said respective plurality of outlet openings;

at least two transport members extending from respective ones of said plurality of outlet openings, said at least two transport members being spaced from each other and extending to said common supply point; and a distribution section surrounding said distributor, wherein said at least two transport members extend to the distillation section for directly delivering a liquid onto the distillation section.

29. A liquid distributor for a distillation column comprising:

a principal container having a plurality of outlet openings in a lower portion thereof, said openings being distributed over a region of said container, said region having a central axis;

a supply point located angularly at an angle to respective ones of said outlet openings relative to said central axis, said angle being in the range of substantially 100° to 180°;

a plurality of transport members extending from each respective one of said outlet openings, each of said transport members leading to said supply point; and a distillation section surmounting said distributor.

30. The distributor according to claim 29, wherein the distillation section has cross-corrugated packing.

31. The distributor according to claim 29, wherein said distributor is a head distributor of the column; and said principal container being at least partially disposed within an upper dome of said column.

32. The distributor according to claim 29, wherein said column is on a floating structure.

33. A liquid distributor for a distillation column comprising:

a principal container having a plurality of outlet openings in a lower portion thereof, said openings being distributed over a region of said container, said region having a central axis;

a supply point located angularly at an angle to respective ones of said outlet openings relative to said central axis, said angle being in the range of substantially 100° to 180°;

a plurality of transport members extending from each respective one of said outlet openings, each one of said plurality of transport members leading to said supply point; and a distillation section surmounting said distributor, wherein said plurality of transport members extend to the distillation section for directly delivering a liquid onto the distillation section.

* * * * *